United States Patent [19]

Aycock et al.

[11] 3,896,047

[45] July 22, 1975

[54] PROCESS FOR RECYCLING A COBALT HYDROFORMYLATION CATALYST

[75] Inventors: David F. Aycock, Lenox; Daniel E. Sliva, Pittsfield, both of Mass.

[73] Assignee: General Electric Company, Pittsfield, Mass.

[22] Filed: June 6, 1973

[21] Appl. No.: 367,553

[52] U.S. Cl. ............... 252/414; 252/412; 252/420; 423/139; 260/429 R; 260/439 R; 260/638 HF
[51] Int. Cl. ............................................. B01j 11/02
[58] Field of Search...... 260/638 HF, 429 R, 439 R; 252/412, 414, 420; 423/139

[56] References Cited
UNITED STATES PATENTS

| | | | |
|---|---|---|---|
| 3,451,943 | 6/1969 | Ruscilli | 252/420 |
| 3,525,762 | 8/1970 | Ichikawa | 260/439 R |
| 3,622,498 | 11/1971 | Stolfa et al. | 252/414 X |
| 3,622,499 | 11/1971 | Stine et al. | 252/414 X |
| 3,634,291 | 1/1972 | Usami et al. | 252/414 |
| 3,772,211 | 11/1973 | Mounce | 252/414 |

*Primary Examiner*—Paul F. Shaver
*Attorney, Agent, or Firm*—Donald M. Papuga; William F. Mufatti

[57] ABSTRACT

An improved process for recycling a cobalt hydroformylation catalyst from a hydroformylation reaction which comprises feeding a hydroformylation product into a mixing zone, adding water thereto, feeding the mixture of water and hydroformylation product into a settling zone where two phases are formed, the phase containing the cobalt hydroformylation catalyst is recycled into the hydroformylation reaction.

9 Claims, No Drawings

PROCESS FOR RECYCLING A COBALT HYDROFORMYLATION CATALYST

BACKGROUND OF THE INVENTION

It is known that the hydroformylation of olefins takes place in the presence of a soluble catalyst. The metal catalyst, usually cobalt, is converted to carbonyls under synthesis conditions and leaves the reaction chamber in this form, dissolved in the reaction products.

The mobility of the catalyst makes it necessary to remove the dissolved cobalt from the reaction products (decobaltation) and then to restore the recovered cobalt to the initial form under which it was introduced into the reaction chamber (regeneration). The method of decobaltation and regeneration is generally called catalyst recycle.

Several methods of decobalting and regenerating the catalyst are known in the prior art. Among these methods are decomposing a cobalt carbonyl in the reactor product by heat and/or aqueous acids, adding aqueous solutions of cobaltous ions to remove the cobalt carbonyl from the organic phase by formation of a cobalt salt and decobalting with an aqueous alkali at high pressures and temperatures to form the alkali metal salt of cobalt hydrocarbonyl. All of these methods have the fundamental defect of destroying the catalyst either completely or partially after the synthesis. This requires reconstitution of the catalyst from the recovered cobalt by passing through intermediate cobalt compounds.

DESCRIPTION OF THE INVENTION

It has been discovered that the cobalt hydroformylation catalyst may be recycled in the same form that it is used in the hydroformylation reaction, i.e., active form, without destroying the catalyst.

The instant invention is concerned with an improved process for recycling a cobalt hydroformylation catalyst from a hydroformylation reaction wherein an olefinic hydrocarbon is reacted with carbon monoxide and hydrogen in the presence of a cobalt hydroformylation catalyst dissolved in an organic solvent in a reaction zone under hydroformylation conditions to produce a hydroformylation product comprising a hydroformylation compound and the cobalt hydroformylation catalyst, wherein the improvement comprises feeding the hydroformylation product into a mixing zone; adding water to the hydroformylation product in the mixing zone; feeding the mixture of water and hydroformylation product from the mixing zone into a settling zone wherein two phases are formed, a solvent phase containing the cobalt hydroformylation catalyst and a water phase containing the hydroformylation compound; separating the solvent phase therefrom and recycling said solvent phase into the initial reaction zone where it is in the active form and catalyzes the hydroformylation reaction.

The term hydroformylation compound includes an aldehyde or its isomeric products, an alcohol or its isomeric products or mixtures thereof.

The hydroformylation process is known in the art and it involves reacting an olefinic compound with carbon monoxide and hydrogen at an elevated temperature and pressure in the presence of a hydroformylation catalyst to produce a hydroformylation compound comprising an aldehyde or its isomeric products, an alcohol or its isomeric products or mixtures thereof.

The olefinic compounds to be hydroformylated are those which can be hydroformylated to produce a hydroformylation compound comprising an aldehyde or its isomeric products, an alcohol or its isomeric products or mixtures thereof, which hydroformylation product is soluble in water and essentially insoluble in the organic solvent employed. These olefinic compounds are known in the art and include compounds such as any aliphatic or cycloaliphatic compounds having at least one aliphatic carbon-to-carbon unsaturation, especially an ethylenic carbon-to-carbon bond. Also included are substituted olefins such as ethers, esters, aldehydes, alcohols, etc., containing olefinic unsaturation. Thus, the process may be applied to the hydroformylation of an olefinic compound which produces compounds comprising an aldehyde or its isomeric products, an alcohol or its isomeric products or mixtures thereof soluble in water and essentially insoluble in the organic solvent employed and having one more carbon atom than the starting olefinic compound. A preferred olefinic compound is an ester such as allyl acetate.

The hydroformylation is carried out under hydroformylation conditions which are temperatures and pressures known to those skilled in the art. Preferably, pressures of from about 1,000 to about 5,000 psi and temperatures in the range of from about 100° to about 200°C. are employed. Somewhat higher or lower temperatures and pressures may, however, be employed within the scope of this invention.

The ratios of hydrogen to carbon monoxide of the synthesis gas (carbon monoxide and hydrogen) charged may vary widely within limits known to those skilled in the art. Suitable ratios of hydrogen to carbon monoxide comprise those within the ratio of from about 1:3 to about 10:1. Higher or lower ratios, however, are within the limits of the art skilled.

The cobalt hydroformylation catalyst employed in the instant invention may be complexed cobalt. The complexed cobalt may be cobalt in complex combination with carbon monoxide. A preferred cobalt catalyst in complex combination with carbon monoxide is dicobalt octacarbonyl. The active form of this catalyst is a cobalt hydrocarbonyl which results from cleavage of the dicobalt octacarbonyl.

Also included within the scope of this invention are modified complexed cobalt catalysts. The complexed cobalt catalysts may be modified by the inclusion of, for example, phosphorus-containing or arsenic-containing ligands in the molecule. Preferably, alkyl, aryl and heterocyclic phosphines are employed. These phosphine modified complexed cobalt catalysts are prepared in accordance with the methods described in U.S. Pat. Nos. 3,239,569; 3,420,898 and 3,496,203, for example.

The active form of the catalyst can be prepared by any of the methods used in the prior art. For example, the various metal salts, the metal powder or metal oxide can be reacted with carbon monoxide and hydrogen to form the carbonyl which can then be converted to the hydrocarbonyl by further hydrogenation. Actually, these reactions can be carried out right in the reactor in which the hydroformylation reaction is to be carried out since the metal, its salts or its carbonyl, either prior to or upon establishing the hydroformylating conditions to be used, will be converted into the hydrocarbonyl. In order to hasten this reaction, it is preferable to use cobalt compounds which are soluble in the reaction mixture, for example, the carbonyl salts of carboxylic acids. Therefore, it is preferred in using cobalt as the hydroformylation catalyst, to introduce it into the reaction mixture in the form of its carbonyl or a salt soluble in the reaction mixture. No matter what form the cobalt is added to the reaction, its active catalytic form is believed to be cobalt hydrocarbonyl, also called cobalt tetracarbonyl hydride.

The form of cobalt present in the hydroformylation reaction mixture is a function of the operating conditions. Not only are different forms produced in the carbonyl formation reaction itself, but also equilibria exist between various carbonyls and between the carbonyls and the metal which are governed by reaction variables such as temperature, carbon monoxide pressure, hydrogen pressure, liquid-phase cobalt concentration, etc. Because of this variable nature of the cobalt catalyst in the reaction mixture the various forms are best described as cobalt hydroformylation catalysts.

The hydroformylation reaction is generally carried out in conventional pressure vessels, such as tanks, towers, autoclaves, or tubular reactors, particularly designed to maintain necessary pressures and temperatures of the reaction.

There are a number of ways in which the hydroformylation reaction may be carried out. Among these processes are those in which the reaction is started at relatively low temperatures, which produces primarily an aldehyde or its isomeric products. The reaction may be then heated to higher temperatures which produce primarily an alcohol or its isomeric products. Alternatively, the whole process may be carried out at the higher temperature wherein primarily an alcohol or its isomeric products is produced. However, at low temperatures the aldehyde product may contain some alcohol and at high temperatures the alcohol may contain some aldehyde.

In hydroformylating allyl acetate, if the reaction is carried out at temperatures of 125°–150°C., the following hydroformylation compounds are produced in admixture: 4-acetoxybutyraldehyde, 2-methyl-3-acetoxypropionaldehyde and 2-acetoxybutyraldehyde. If the reaction is then heated to temperatures of up to 180°C. or higher, or if the reaction is carried out starting at the higher temperature, the following hydroformylation compounds are produced in admixture: 4-acetoxybutanol; 1,4-butanediol; 1,4-butanediol diacetate; 2-methyl-3-acetoxypropanol; 2-methyl-1,3-propanediol; 2-methyl-1,3-propanediol diacetate; 2-acetoxybutanol; 1,2-butanediol and 1,2-butanediol diacetate.

The organic solvent which is employed in the instant invention may be any solvent in which the aldehyde or its isomeric products or the alcohol or its isomeric products or the mixture thereof produced from the hydroformylation reaction is essentially insoluble. A preferred organic solvent is an aliphatic hydrocarbon such as heptane, kerosene, n-decane, etc.

The instant catalyst recycle comprises continuously removing the hydroformylation product from the initial reaction zone where hydroformylation takes place and feeding it into a mixing zone. Water is added to the hydroformylation product in the mixing zone. A mixture of the hydroformylation product and water is then fed into a settling zone wherein two phases are formed. The upper phase or solvent phase contains the active cobalt hydroformylation catalyst while the lower phase or water phase contains the remainder of the hydroformylation product which is an aldehyde or an alcohol or a mixture of an aldehyde and an alcohol. The solvent phase containing the active cobalt hydroformylation catalyst is removed and recycled into the initial reaction zone where it is the catalyst for the hydroformylation reaction.

The instant catalyst recycle may be carried out in batch, semi-continuously, or continuously. Preferably, the catalyst recycle is carried out continuously.

The water phase containing an aldehyde or its isomeric products or an alcohol or its isomeric products or mixtures thereof also contains a small amount of the cobalt hydroformylation catalyst. The hydroformylation catalyst may be removed from the water phase by extraction with an organic solvent, for example.

The mixing and settling is carried out in conventional vessels, such as tanks, towers or pressure tanks or towers.

The catalyst recycle may be carried out at room temperature and pressures from sub-atmospheric to elevated pressure. Preferably, the mixing and settling vessels are under a carbon monoxide pressure of about one atmosphere. The carbon monoxide atmosphere aids in preventing any decomposition of the cobalt hydroformylation catalyst.

DESCRIPTION OF THE PREFERRED EMBODIMENT

The following Examples are set forth to illustrate more clearly the principle and practice of this invention to those skilled in the art. Unless otherwise specified, where parts or percents are mentioned, they are parts or percents by weight.

EXAMPLE 1

Allyl acetate and a heptane solution of cobalt carbonyls (3.5 g./liter as cobalt) are pumped separately, at equal rates, into a 1 liter stirred autoclave. The autoclave is heated to 150°C. and is pressurized to 3,000 psi with an equal volume gas mixture of hydrogen and carbon monoxide. The product is continuously removed from the autoclave and added to a mixing chamber. Water is pumped into the mixing chamber in an amount equal to about 20 volume percent of the aldehydes produced from allyl acetate. The mixture is sent to a settling chamber where the heptane phase, containing the cobalt carbonyl catalyst, and the aldehyde phase are separated. The heptane phase is recycled back to the autoclave. The aldehyde phase, coming from the separator, is found to contain only about 0.07 g./liter (as cobalt) of cobalt carbonyls.

EXAMPLE 2

The catalyst recycle scheme of Example 1 is repeated with the exception that kerosene is used as a solvent instead of heptane. The results obtained are the same as those of Example 1.

EXAMPLE 3

113.0 g. of allyl acetate, 6.0 g. of cobalt acetate and 300 ml. of n-decane are placed in a 1 liter autoclave and pressurized to 3,000 psi with an equal volume gas mixture of hydrogen and carbon monoxide. The autoclave is heated to 145°C. where an exotherm started which raises the temperature of the autoclave to 205°C.

After the autoclave is cooled, the product mixture is found to contain two phases. Addition of 20 ml. of water causes the cobalt carbonyl catalyst to partition into the n-decane phase leaving a lightly brown colored lower phase (containing a mixture of aldehyde and alcohol isomer products of allyl acetate, plus water). The top phase containing the active cobalt carbonyl catalyst, is again placed in a 1 liter autoclave with allyl acetate (113.0 g.) and the hydroformylation reaction is carried out as described above. Water is added to the product mixture, the phases are separated and the top phase is again used for the hydroformylation of allyl acetate.

EXAMPLE 4

113.0 g. of allyl acetate, 6.0 g. of cobalt acetate and 300 ml. of heptane are placed in a 1 liter autoclave and pressurized to 3,000 psi with an equal volume gas mixture of hydrogen and carbon monoxide. The autoclave is heated to 145°C. where an exotherm takes place. The temperature of the autoclave is maintained at about 190°C. for 1.5 hours. After the autoclave has cooled, the product mixture is found to contain two phases. Addition of 20 ml. of water causes the cobalt carbonyl catalyst to partition into the heptane phase leaving a lightly colored lower phase (containing the alcohol isomer products of allyl acetate, plus water). The top phase, containing the active cobalt carbonyl catalyst, is separated and used to repeat the above procedure.

EXAMPLE 5

113.0 g. of allyl acetate, 6.25 g. of cobalt acetate, 10.1 g. of tri-n-butylphosphine and 300 ml. of heptane are mixed in an autoclave and pressurized to 1,000 psi with a gas mixture containing 2 parts hydrogen and 1 part carbon monoxide. The autoclave is heated to 150°C. where an exotherm takes place. The autoclave is maintained at a temperature of 190°C. for 1.5 hours. After the autoclave has cooled, the product mixture is found to contain two layers. Addition of 20 ml. of water causes the cobalt carbonyl catalyst to partition into the heptane phase leaving a lightly colored lower phase (containing the alcohol isomer products of allyl acetate plus water). The top phase, containing the active cobalt carbonyl catalyst, is separated and used to carry out the above procedure.

It should, of course, be apparent to those skilled in the art that changes may be made in the particular embodiments of the invention described which are within the full intended scope of the invention as defined by the appended claims.

What is claimed is:

1. In an improved process for recycling a cobalt hydroformylation catalyst from a hydroformylation reaction wherein an olefinic compound is reacted with carbon monoxide and hydrogen in the presence of a cobalt hydroformylation catalyst dissolved in an inert organic solvent in a reaction zone under hydroformylation conditions to produce a hydroformylation product comprising a hydroformylation compound and the cobalt hydroformylation catalyst, wherein the improvement comprises feeding the hydroformylation product into a mixing zone; adding water to the hydroformylation product in the mixing zone; feeding the mixture of water and hydroformylation product from the mixing zone into a settling zone wherein two phases are formed, a solvent phase containing the cobalt hydroformylation catalyst and a water phase containing the hydroformylation compound; separating the solvent phase therefrom and recycling said solvent phase into the initial reaction zone.

2. The process of claim 1 wherein the hydroformylation product comprises in admixture an aldehyde or its isomeric products, an alcohol or its isomeric products or mixtures thereof.

3. The process of claim 1 wherein the organic solvent is an aliphatic hydrocarbon.

4. The process of claim 1 wherein the olefinic compound is allyl acetate.

5. The process of claim 1 wherein the cobalt hydroformylation catalyst is dicobalt octacarbonyl.

6. The process of claim 1 wherein the hydroformylation is carried out at a temperature of from about 100° to about 200°C.

7. The process of claim 1 wherein the hydroformylation is carried out at pressures from about 1,000 to about 5,000 psi.

8. In an improved process for recycling a cobalt hydroformylation catalyst from a hydroformylation reaction wherein allyl acetate is reacted with carbon monoxide and hydrogen in the presence of a cobalt hydroformylation catalyst dissolved in an inert organic solvent in a reaction zone under hydroformylation conditions to produce a hydroformylation product comprising, in admixture: hydroformylation compounds consisting of 4-acetoxybutyraldehydes, 2-methyl-3-acetoxypropionaldehyde and 2-acetoxybutyraldehyde and the cobalt hydroformylation catalyst, wherein the improvement comprises feeding the hydroformylation product into a mixing zone; adding water to the hydroformylation product in the mixing zone; feeding the mixture of water and hydroformylation product from the mixing zone into a settling zone wherein two phases are formed, a solvent phase containing the cobalt hydroformylation catalyst and a water phase containing the hydroformylation compound; separating the solvent phase therefrom and recycling said solvent phase into the initial reaction zone.

9. In an improved process for recycling a cobalt hydroformylation catalyst from a hydroformylation reaction wherein allyl acetate is reacted with carbon monoxide and hydrogen in the presence of a cobalt hydroformylation catalyst dissolved in an inert organic solvent in a reaction zone under hydroformylation conditions to produce a hydroformylation product comprising in admixture: a hydroformylation compound consisting of 4-acetoxybutanol; 1,4-butanediol; 1,4-butanediol diacetate; 2-methyl-3-acetoxypropanol; 2-methyl-1,3-propanediol; 2-methyl-1,3-propanediol diacetate; 2-acetoxybutanol; 1,2-butanediol; 1,2-butanediol diacetate and the cobalt hydroformylation catalyst, wherein the improvement comprises feeding the hydroformylation product into a mixing zone; adding water to the hydroformylation product in the mixing zone, feeding the mixture of water and hydroformylation product from the mixing zone into a settling zone wherein two phases are formed, a solvent phase containing the cobalt hydroformylation catalyst and a water phase containing the hydroformylation compounds; separating the solvent phase therefrom and recycling said solvent phase into the initial reaction zone.

* * * * *